F. W. HARDY & E. H. HUNGERBÜHLER.
ELECTRICAL ACCUMULATOR.
APPLICATION FILED FEB. 20, 1911.

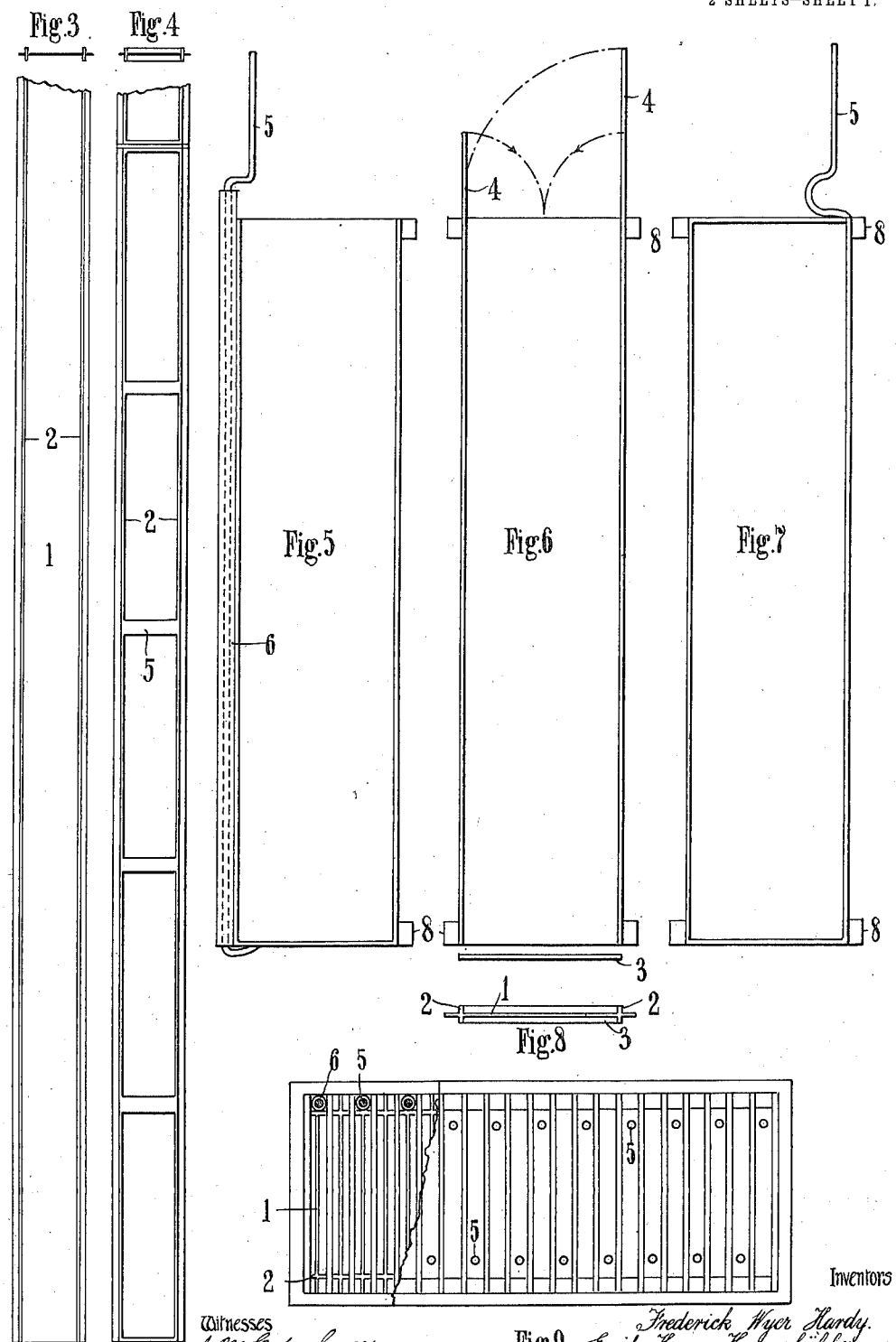

1,032,404.

Patented July 16, 1912.
2 SHEETS—SHEET 2.

Witnesses

Inventors
Frederick Wyer Hardy
and Emil Henry Hungerbühler
per:—
Attorney.

UNITED STATES PATENT OFFICE.

FREDERICK WYER HARDY AND EMIL HENRY HUNGERBÜHLER, OF SALTBURN, ENGLAND.

ELECTRICAL ACCUMULATOR.

1,032,404.

Specification of Letters Patent.

Patented July 16, 1912.

Application filed February 20, 1911. Serial No. 609,566.

*To all whom it may concern:*

Be it known that we, FREDERICK WYER HARDY, a subject of the King of Great Britain, residing at The Hollies, Saltburn, in the county of York, England, and EMIL HENRY HUNGERBÜHLER, a subject of the Republic of Switzerland, residing at 6 Dundas street, Saltburn, in the county of York, England, have invented new and useful Improvements in Electrical Accumulators, of which the following is a specification.

This invention relates to improvements in secondary batteries designed to render them more efficient in action, of greater capacity weight for weight and volume for volume, and less liable to deterioration in use. To this end the plates are constructed in an improved manner enabling all the active material to be interposed in the path of the current between the metal surfaces of the plates. The active material itself is so prepared as to have the best chemical properties for the purpose in view, and its mechanical stability is secured by inserting between the plates an inert porous substance which both serves to admit fluid to the active material and to retain that material in position. Furthermore, the connections of the plates to the terminals of the battery are improved both in structure and arrangement so as to insure uniform utilization of the active material throughout the cell and the protection of the terminals themselves from injurious action.

Figure 12:
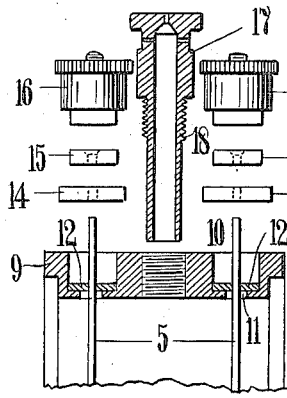
Figure 13:
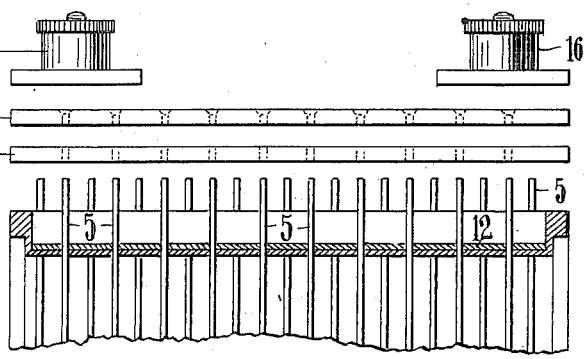
Figure 10:
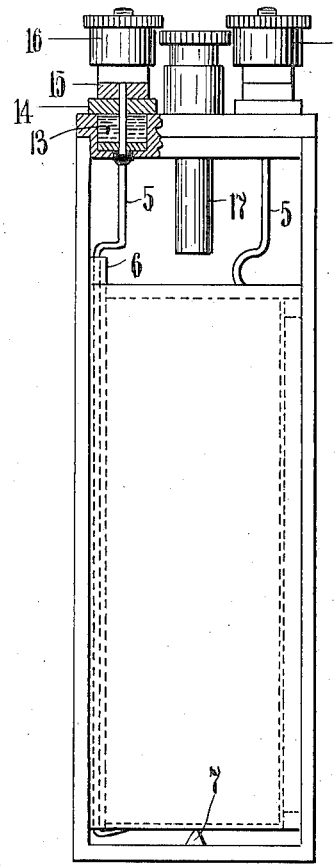
Figure 11:
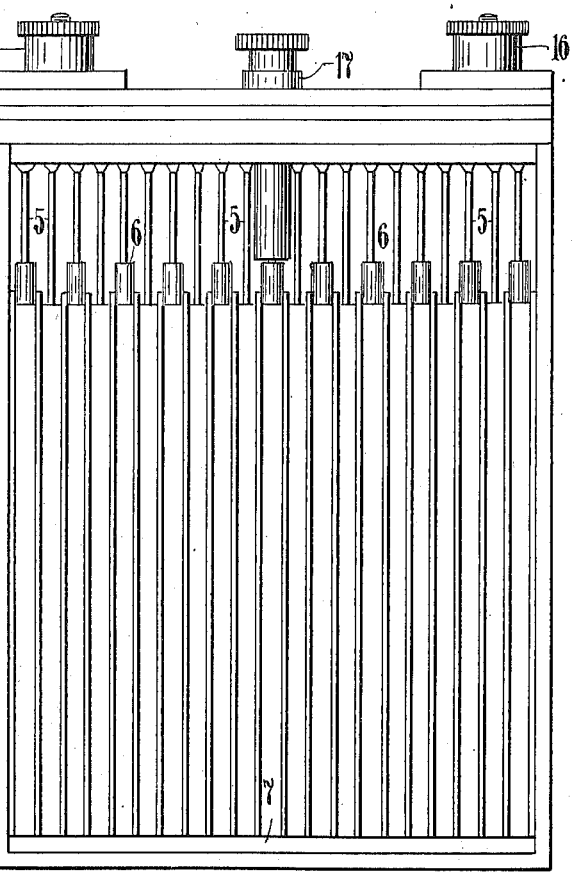

In the accompanying drawing, Figures 1 and 2 illustrate elevations, and Figs. 3 and 4 cross sections of improved constructions of plate. Figs. 5, 6 and 7 illustrate single plates on a large scale and the method of attaching the terminals in completing the plates. Fig. 8 is a cross section on a corresponding scale. Fig. 9 illustrates an assembled cell partly in plan, partly in section. Fig. 10 illustrates the cell in end elevation, and Fig. 11 the same in side elevation. Fig. 12 shows the details of the terminals in end elevation, and Fig. 13 the same in side elevation.

In the plates commonly in use in secondary batteries, the active material is inserted in holes in the plates so that the surface of the plate in contact with the material is parallel instead of at right angles to the path of the current between the plates.
Moreover a large part of the metal surface of the plate directly confronts a plate of opposite sign with no active material interposed. Further, with this construction of plates, in order to secure the necessary mechanical strength, it is generally usual to make the plates of an alloy of lead and some other metal. The presence of such other metal has two disadvantages; in the first place it can take no active part in the chemical work of the cell, and in the second place it is liable to cause a harmful chemical effect by setting up local action. According to the present invention, therefore, the plates are so formed that practically the whole of the opposing surfaces of neighboring electrodes are covered by the active material which is thus interposed in the direct path of the current between the metal plates. The plates themselves are made of pure lead. Moreover the thickness of the metal is considerably reduced as compared with what was necessary in the older construction, and also the plates are set much closer together in the cell. The consequence is that a cell of given capacity can be made of much less weight and much less volume than was hitherto the case, besides affording increased active surface resulting in increased electrical efficiency and increased rate of charge and discharge.

In structure, as may be seen from Figs. 1 to 7, the plates are formed with a very thin central web having a flange at right angles around the edge. For the plates at the end of the cell this flange need only protrude from one side, but in the central plates it will extend on both sides as illustrated. The depth of the flange is given by the depth of active material it is desired to have against the plate. The larger the amount of active material, the greater the capacity, but the greater its depth the less the efficiency. These two factors, therefore, have to be taken into consideration in determining the depth of material to be used in a cell designed for any particular purpose.

The plates may conveniently be constructed in the form described by an extrusion process. By the use of suitable dies, it is possible to extrude a long strip such as illustrated in Figs. 1 and 3, consisting of a central thin web 1, with a flange 2 on either side if desired, the web if desired protruding beyond the flange as shown. The plate which is extruded can be cut up into suitable lengths and top and bottom flanges such as 3 (Fig. 6) may be formed separately and burned on. Instead, a part of the central web may be cut away and the projecting free flanges 4 bent over as is indicated in Fig. 6. Of course if desired, the web alone may be formed by extrusion or rolling and all the flanges separately attached by burning. Again the plates may conveniently be formed by rolling. The rollers have circumferential grooves to form the side flanges 2, and may have longitudinal grooves at intervals to form the top and bottom flanges. Such apparatus will produce a length of plate like that illustrated in Figs. 2 and 4 which can be cut up by sections passing through the transverse ribs 5, as indicated at the top of the figure. Rolling has already been used for producing continuous lengths of serrated plate and grooved rollers have been employed for making pairs of flanged plates. To produce continuous lengths of flanged plate as here desired the roller must have circumferential grooves extending completely around them and longitudinal grooves at intervals corresponding to the length of the plates.

A third method of producing the plates other than by casting is by pressing a continuous plain strip of lead into the required shape between suitably formed grooved flat dies in a press or stamp, producing one or more complete plates at each blow and separating them or not as desired.

It will be noted that when the plates are set up in the cell, fresh electrolyte can only circulate to their surfaces by entrance from the edges. For this reason it is advantageous to make the plates long and narrow rather than square. Hence the extrusion or rolling process is the more particularly suited to their production.

It is found that if both the positive and negative electrodes of a cell have their terminals attached at the upper edges, the electrolytic action is largely confined to the upper part of the cell, with the result that the active material at the lower portion is almost inoperative. This defect is of course emphasized with narrow deep plates. To avoid this difficulty according to the present invention the terminals of electrodes of opposite polarity are attached not merely at opposite corners on the upper edge but instead at diagonally opposite corners. It is of course necessary for this purpose to inclose the connectors 51 (Fig. 5) which go to the bottom of the cell, in glass or like insulating tubes 6 so that contact is not made either directly or through the electrolyte with the upper part of the plate. Fig. 7 shows the position of attachment of the leading-in wire 5 for an electrode of opposite polarity.

Preferably the connectors are made of round thin lead wire as there is no need for the massive lugs hitherto used for the conveyance of current. On account of the changes hereinbefore and hereinafter described, the number of plates in a cell built according to the present invention, can be made very considerable and therefore the current to be collected from each plate need only be comparatively small. It may be stated that bi-functional plates have been proposed, consisting of long narrow flanged strips clamped with interposed separators upon bus bars arranged at opposite ends of the strips and each contacting with alternate strips. It is not of course broadly new to use a wire connector even upon flanged plates, nor to make connection to alternate electrodes at diagonally opposite corners.

The sulfuric acid present in the electrolyte, in addition to re-absorbing the water formed on the plates during the discharge, acts principally as a conductor, so that up to and within certain limits, the resistance of the electrolyte is decreased with increased quantity of water. Generally speaking, however, the acid has a destructive tendency upon the materials present, particularly upon that part of the active material which is not immediately in front of the active surfaces, or, in other words, upon material, which due to its incorrect position, is only partially or insufficiently under the influence of the active gases. Material thus exposed is converted sooner or later into an inactive sulfate, from which it is practically impossible to recover it. It is this action, generally called sulfating, which causes the rapid depreciation of the plates of the grid type at present on the market, and it is also due to this action that accumulators which have been left uncharged for a considerable period or have become short circuited, suffer heavy depreciation or complete destruction. The only remedy in this respect therefore is to design the plates in such a way that all the active material is immediately in front of the active surfaces, not at the sides or even behind the same as in the grid or lattice type of plates, that the depth of the active material is such as to bring every particle within efficient reach of the gases, and that the electrical density is evenly spread over the surface of the plates. The specific gravity of the electrolyte may vary between the limits of 1.1 to 1.3 which latter should not be exceeded in any case.

In order that the thickness of the plates may be reduced as far as possible, despite the requirements of physical strength, and in order that the active material disposed upon the web of the plate between its surrounding flanges may be retained in position, it is desirable to provide between the plates a separator which will serve also as a support. The active material of the kind described hereinbefore has, unlike some of the other sulfates of lead, practically no setting power, and as it consists in the wet state of little better than loose powder in structure held together by capillary attraction it has no mechanical strength. It should also be remembered that if the active material is, for electrical and chemical reasons, situated in front of the active surfaces of the plates as suggested, the gas is generated behind it, thus causing a very considerable outward thrust, which no active material could be expected to resist without extraneous support. In the grid, lattice, or open type plates, the active material is held mainly by the sides of the grids, or lattices, not in direct line with the path of the electrons so that the thrust caused by the comparatively small amount of gas generated at the sides is not so considerable and is not forward but sidewise. This problem is solved by the insertion of separators of inert material, taking up the whole of the spaces between the plates, thus combining plates, separators, and active material in a solid block within the cell and utilizing the walls of the cell to take up the end strain. The inert material must be fine enough in composition as to be impermeable by the smallest particles of the active material, and of sufficient mechanical strength to withstand the strain. At the same time since the circulation of the electrolyte between the plates has to occur by passage through the separator from its edge, it is necessary even when the plates are made of small width, as above described, that the inert material should be porous and possess absorbing power or capillary action to a high degree. Further the separator has in part to serve the function of retaining the gases generated by the electrolytic action at least for such time as will enable them to enter into loose combination with the active material so as to be retained thereby. Loss of gas in the first place means loss of energy, and in the second place necessitates subsequent filling up with water.

Of the various fibrous materials of an organic nature that have been experimented upon as separating sheets, filter paper has so far been found much the best. As is well known, the best forms of filter paper, as distinct from blotting paper and like materials, consist of almost chemically pure cellulose. They are very porous and are capable of retaining a considerable amount of moisture. They interpose comparatively little resistance in the path of the current, but nevertheless are dense enough not to be penetrated by the active material. They have further the advantage of being light in weight and cheap. This material may therefore be used in the form of one or more layers of flat strips, inserted between the plates, these strips being preferably made of such dimensions as to overlap the edges of the plates. It may, however, be found that in the course of time even this material in the presence of acid or due to electrolytic action gives rise to organic compounds, acting injuriously upon the plates or active material, and it may therefore be better to use a material of inorganic nature. Ordinary porous earthenware is unsuitable because it interposes too great resistance in the path of the current and is incapable of retaining a large amount of liquid. It is, however, possible to find a suitable separator in other materials. These of course must in the first place be chemically suitable, that is, they must be unacted upon by the acid or the active material or the gases generated during action. They must neither be altered by the electrolytic process which is going on, nor must they have any deleterious effect upon the plates or active material. There are many materials which will satisfy these requirements, but there are besides certain physical limitations, of which the porosity is one of the most important.

If kaolin powder or china clay is combined by heat and without the use of a glaze or flux, it forms a mass which although apparently solid yet possesses a certain amount of porosity. For the purposes of the present invention, the clay is baked into very thin plates preferably a little wider than the electrodes of the cell. It is to be noted that reduction of thickness to the smallest possible limits is of importance as the electrical resistance will depend upon the thickness and if the plates are thin they will be comparatively flexible and less likely to break. There is no need for any considerable thickness for the sake of strength because the plates have electrodes in contact with them on either side. The slabs will therefore be flat without ribs, channels or corrugations and will occupy the whole space between the electrodes. The active material of these electrodes forms a sort of cushion and the electrodes themselves are flexible so that they will bed down upon the porous slabs. If desired these porous slabs may be made by baking clay, breaking up the mass into fine particles, and then consolidating these by the aid of a suitable adhesive such, for example, as raw kaolin, silicates or glasses which will become soft and viscous at high temperatures. Kaolin has already been proposed for separators though no method of using it has been disclosed. There may be some displacement of the active material when the plates are first put into a cell. For this reason it is desirable to provide the base of the cell with suitable lugs or ribs 7 (Fig. 10) of non-conducting material which will raise the plates a little way from the bottom. Also the plates may be provided with laterally extending lugs 8 (Figs. 5 to 7) which will keep them centrally disposed in a cell of rather greater width than the plates themselves.

As has been already indicated, in view of the large number of plates which, with the methods of construction disclosed it is possible to employ, the terminal wire which takes current through each plate, need only be very small in section. The terminal itself should be removed as far as possible from the action of the acid, for if this end can be secured, the terminal may be made of brass or copper, which in cells as ordinarily constructed would be very quickly corroded. As the terminal wires are so slight, the terminals require separate support. Conveniently the cell is provided with an insulating cover 9 of ebonite or the like. In this cover two horizontal slots 10 are made extending the length of the cell, i. e. across all the plates. Holes 11 in the bottom of these slots permit the passage of the separate terminal wires 5; or instead, a narrow slot may replace the separate holes. In the latter case in particular, a thin strip 12 of ebonite or the like provided with holes corresponding in number and size to the terminal wires 5, is put in the bottom of each slot. The trough thus formed is filled with a suitable sealing material 13, preferably of the kind containing gutta percha, which becomes liquid when heated, and congeals on cooling to a semi-plastic and adhesive mass, which is entirely water and acid proof. Two other strips 14, of similar material to the cover 9, but of such dimensions as to overlap the edges of the slot, are now laid over the troughs and cemented or otherwise fastened on to the cover. These second strips are also provided with holes corresponding to the number and position of the wires, allowing the latter to pass through these and project on the upper side. Connecting bars or so-called bus-bars 15 of brass, copper, etc., also provided with similar holes for the terminal wires, are now laid on the top of the second strip, the wires after passing through both lots of holes, being trimmed off flush with the upper sides of the bars 15 and connected thereto as by soldering. The upper strips serve the triple purpose of inclosing the sealing material, insuring a perfect seal, and elevating the bus-bars 15 above the top of the cover 9 out of reach of any acid. Each of the two bus-bars is provided with suitable terminals or binding posts 16. If desired, the cover 9 may be made as a simple strip of ebonite perforated to allow the passage of the wires 5 and the troughs for containing the sealing material 13 may be separately secured upon the top of the cover.

As has been already indicated, the battery cell thus made up is almost a dry cell in form. The separators are capable of retaining in themselves practically all the liquid that is necessary, so that if the cell should be turned upside down, there is only a little liquid to run down upon the cover. There must of course be an opening for the escape of any gases which may not be retained by the active material or the separators when a heavy current is passing, as otherwise an undue pressure might be set up in the cell. Any spilling of the electrolyte through such ventilating opening may be obviated by the use of a tubular plug 17 of acid-proof material, such as is illustrated in Figs. 10 and 12. This is provided with a screwed portion 18 screwing into the cover 9. and projects sufficiently far below the cover to extend above the level of the liquid which runs down upon the cover when the cell is inverted. Ventilating tubes thus projecting inward have been proposed in ordinary cells before; but it is considered that they are only of use, and they are here only claimed, in connection with a cell in which the space between the electrodes is filled by separators so that the quantity of electrolyte is small.

It will be clear that the general principles of arrangement and construction embodied in the forms of electrode and separator above described will be of value in cells of any kind. Therefore, although designed particularly in connection with lead accumulators using sulfuric acid as the electrolyte, the various features so far as they are applicable, may be employed in cells having plates of other material than lead and active material of composition other than that above set forth with alkaline or other electrolytes.

What we claim is:—

1. In a secondary battery, the combination of a container, a plurality of thin electrodes, a cover fixed above said electrodes and provided with a pair of longitudinal channels, individual terminal wires for said electrodes each passing through a hole in the bottom of the respective channel, sealing compound filling the two channels and a pair of bus bars arranged above the respective channels and joined to the terminal wires of one polarity.

2. In a secondary battery, the combination of a container, a plurality of thin electrodes, a cover fixed above said electrodes and provided with a pair of longitudinal channels, individual terminal wires for said electrodes each passing through a hole in the bottom of the respective channel, a pair of insulating strips lying at the bottom of the respective channels and threaded over the respective terminal wires, sealing compound filling the two channels, and a pair of bus bars arranged above the respective channels and joined to the terminal wires of one polarity.

3. In a secondary battery the combination of a container, a plurality of thin electrodes, a cover fixed above said electrodes and provided with a pair of longitudinal channels, individual terminal wires for said electrodes each passing through a hole in the bottom of the respective channel, a pair of insulating strips lying at the bottom of the respective channels and threaded over the respective terminal wires, sealing compound filling the two channels, a pair of insulating strips covering said channels also threaded over the respective terminal wires and bus bars joined to the respective terminal wires and mounted above said covering strips so as to be raised above the level of the cover of the container.

4. In a secondary battery, the combination of a container, a plurality of thin electrodes occupying only the lower portion of said container, a cover to said container, a tubular plug is said cover projecting down into the space above said electrodes almost to the top of the electrodes, a pair of bus bars above said electrodes and thin flexible wires passing through said cover and joining the electrodes of each polarity to the corresponding bus bar.

5. In a secondary battery, the combination of a container, a plurality of thin electrodes occupying only the lower portion of said container, separators interleaved therewith to form a solid block, a cover to said container, a tubular plug in said cover projecting down into the space above said electrodes almost to the top of the electrodes, a pair of bus bars above said electrodes and thin flexible wires passing through said cover and joining the electrodes of each polarity to the corresponding bus bar.

6. In a secondary battery, the combination of a container, a plurality of thin closely spaced electrodes occupying only the lower portion of said container, separators formed of thin slabs of baked clay interleaved therewith to form a solid block, a cover to said container, a tubular plug in said cover projecting down into the space above said electrodes almost to the top of the electrodes, a pair of bus bars above said electrodes and thin flexible wires passing through said cover and joining the electrodes of each polarity to the corresponding bus bar.

7. In a secondary battery, the combination of a container, two sets of electrodes of opposite polarity each set comprising a plurality of thin plates, a cover fixed above said electrodes and provided with a pair of longitudinal channels, thin flexible terminal wires proceeding from diagonally opposite corners of alternate plates and each passing through a hole in the bottom of the respective channel, sealing compound filling the two channels and a pair of bus bars each arranged above its respective channel and connected to the terminal wires of one polarity.

8. In a secondary battery, the combination of a container, two sets of electrodes of opposite polarity each set comprising a plurality of thin plates, a cover fixed above said electrodes and provided with a pair of longitudinal channels, thin flexible terminal wires proceeding from diagonally opposite corners of alternate plates and each passing through a hole in the bottom of the respective channel, sealing compound filling the two channels, a pair of bus bars each arranged above its respective channel and connected to the terminal wires of one polarity, and insulating tubes inclosing the longer of said terminal wires.

In testimony whereof we have signed our names to this specification in the presence of two subscribing witnesses.

FREDERICK WYER HARDY.
    EMIL HENRY HUNGERBÜHLER.

Witnesses:
  LILY ELIZABETH BUCKLEY,
  FLORENCE ROOKS.